May 9, 1950     L. M. STARK     2,507,229
RANGE FINDER
Filed June 4, 1947
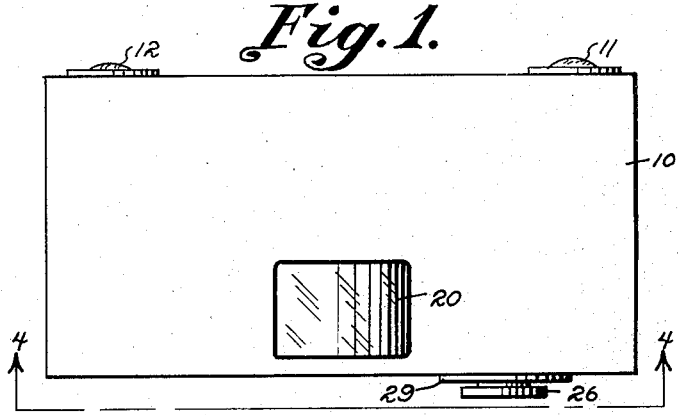
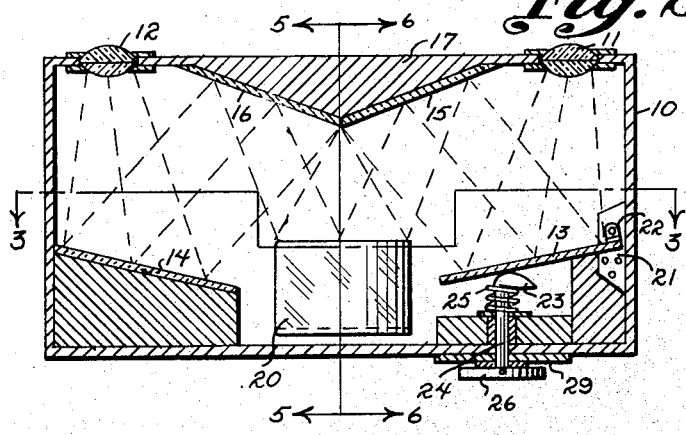
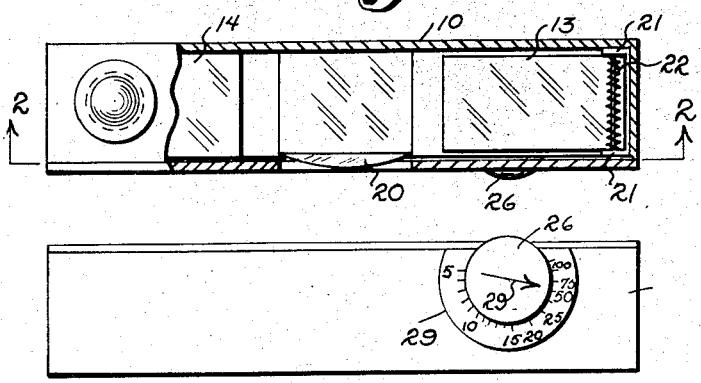
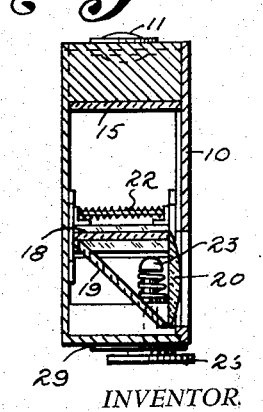
INVENTOR.
Lawrence M. Stark
BY Victor J. Evans & Co.
ATTORNEYS Patented May 9, 1950

2,507,229

UNITED STATES PATENT OFFICE 2,507,229

RANGE FINDER

Lawrence M. Stark, Alexandria, Va.

Application June 4, 1947, Serial No. 752,335

1 Claim. (Cl. 88—2.7)

The present invention relates to range finders and it consists in the combinations, constructions and arrangements of parts herein described and claimed.

Generally, the invention comprises a range finder having a compact housing, at one side of which is mounted a pair of lenses which are adapted to admit light and each of which is provided with a pair of reflectors which direct the image received from each lens to a ground glass, and thence by means of a reflector to a viewing window in the top of the housing. One of the reflectors is provided with a spring mounting which normally tends to hold the same against a detent extending through one side of the range finder housing and which terminates in an indicator. It is accordingly, an object of the invention to provide a simple, compact and efficient range finder.

A further object of the invention is to provide a range finder which is provided with simple and efficient means for quickly determining the range of a distant object.

A further object of the invention is the provision of an inexpensive device of the character described which will have particular use in the photographic art.

Other and further objects of the invention will become apparent from a reading of the following specification taken in conjunction with the drawings, in which:

Figure 1 is a plan view of an embodiment of the invention,

Figure 2 is a horizontal sectional view of Figure 1,

Figure 3 is a sectional view taken along the line 3—3 in Figure 2,

Figure 4 is a sectional view taken along line 4—4 in the direction of the arrows in Figure 1, Figure 5 is a sectional view taken along line 5—5 of Figure 2, and Figure 6 is a sectional view taken along line 6—6 of Figure 2.

Referring more particularly to the drawings, there is shown therein a range finder having a housing 10 which is provided with identical inexpensive lenses 11 and 12 at one side thereof, which lenses are adapted to pass light rearwardly into the housing to reflectors 13 and 14, respectively, and thence to a pair of reflectors 15 and 16, respectively, and thence to a ground glass 18. Reflectors 15 and 16 are mounted upon a triangular portion 17 formed in the front side of the housing. The focal length of the lenses will correspond to the total distance from one of the lenses to the ground glass.

The reflectors 15 and 16, respectively, pass the light received from lenses 11 and 12 to form an image upon a vertically-extending ground glass 18, and this image may be viewed through window 20 mounted in the top of the housing by means of reflector 19 mounted at an angle back of ground glass 18. Window 20 is formed either of plain glass or of glass possessing a slight magnifying property.

One of the reflectors, 13, is hingedly mounted as indicated at 21 to the inner side of the housing and is provided with a spring 22 which normally urges the same rearwardly to abut against a detent 23 which is carried at the inner end of a shaft 24 and which detent is normally urged inwardly against the reflector 13 by means of a spring 25 mounted therearound. It will be seen that the detent 23 is eccentric and that various positions it may assume will cause an alteration of the angle of the reflector.

To the outer end of the shaft 24 is affixed an operating handle 26 which is provided with an indicating pointer 27 and the adjacent portion of the housing 10 has mounted thereon a thin wafer 29 which is provided with indicia 28.

In the process of manufacture, it would be difficult ordinarily to produce all range finder units identical in every respect and hence provision is made for the rapid assembly and adjustment of each unit so that all may conform to rigid specifications and standards. This has particularly to do with the distance-indicating scale 28 and pointer 27. A master scale of various distances is first formed by actual measurement. Images of an object of any pre-determined distance are caused to blend in the viewing window 20 as knob 26 is adjusted to the correct position. This distance is marked upon the master scale opposite the arrow 27. When all desired distances are thus marked out upon such a master scale it is used as a pattern from which additional and identical scales in the shape of wafers 29 are formed for use with the completed finders. In making the necessary adjustment of wafer 29 to any particular finder an object ten feet distant is caused to blend in the viewing window 20 and the wafer 29 then adjusted to the proper indication and then affixed to the housing in such position.

To operate the range finder it is merely necessary to focus the device upon a distant object and then rotate the handle 26 until the images received from both lenses 11 and 12 become merged upon the plate 18 as viewed through the window 20, thereupon a reading may be taken from the indicia 28 as pointed out by the indicator 27. The camera of the user may then be set accordingly.

While but one form of the invention has been shown and described herein, it will be readily apparent to those skilled in the art that many minor modifications may be made without departing from the spirit of the invention or the scope of the appended claims. It will also be understood that, instead of moving a reflector 13 or 14, one of the lenses may be moved or shifted horizontally to achieve the same result. Also, instead of viewing the image through the top of the device, as shown, it may be arranged so as to view the image through an opening at the rear of the finder.

What is claimed is:

A device of the character described, which comprises a housing having a triangular portion formed in the front side of the housing and extending into the housing, a ground glass mounted within said housing, a pair of lenses mounted in the front of said housing on the opposite ends of said triangular portion, a pair of reflectors for reflecting light rays coming through said lenses, one reflector for each of said lenses, a second pair of reflectors mounted on said triangular portion in angular relation to each other and said reflectors adapted for reflecting light rays from said first-named reflectors to form an image on said ground glass, a viewing window for viewing said image on said ground glass, said viewing window being mounted in the top of said housing, one of said reflectors of said first-named pair of reflectors being mounted in said housing for pivotal movement with respect to one end of said reflector, whereby said reflector may be moved in angular position, spring means for normally urging said angularly movable reflector against means for altering the angular position of said reflector, and means for altering the angular position of said movable reflector, said means consisting of a rotatable shaft, a detent carried by said shaft at one end thereof, an operating handle attached to the other end of said rotatable shaft, and spring means urging said detent against said movable reflector, whereby when said shaft is rotated, said detent pressing against said movable reflector causes said reflector to pivot around the pivoted end thereof, thereby changing the angular position of said reflector with reference to said housing, an indicating point on the operating handle on said rotatable shaft and a scale on said housing adjacent said operating handle adapted to cooperate with said indicator point to permit said device to be utilized as a range-finder.

LAWRENCE M. STARK.

REFERENCES CITED

The following references are of record in the file of this patent:

UNITED STATES PATENTS

| Number | Name | Date |
|---|---|---|
| 1,918,143 | Snyder | July 11, 1933 |
| 2,015,314 | Kuppenbender | Sept. 24, 1935 |
| 2,023,838 | Kuppenbender | Dec. 10, 1935 |
| 2,106,622 | Pritschow et al. | Jan. 25, 1938 |
| 2,186,806 | Liebmann | Jan. 9, 1940 |
| 2,242,452 | Cozin | May 20, 1941 |